(12) United States Patent
Kimura et al.

(10) Patent No.: US 7,880,344 B2
(45) Date of Patent: Feb. 1, 2011

(54) X-Y TABLE ACTUATOR

(75) Inventors: Yoshihiro Kimura, Tokyo (JP); Toshiyuki Aso, Tokyo (JP); Masashi Ishii, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 12/598,885

(22) PCT Filed: May 27, 2008

(86) PCT No.: PCT/JP2008/059692

§ 371 (c)(1), (2), (4) Date: Nov. 4, 2009

(87) PCT Pub. No.: WO2008/149718

PCT Pub. Date: Dec. 11, 2008

(65) Prior Publication Data

US 2010/0127578 A1    May 27, 2010

(30) Foreign Application Priority Data

May 30, 2007 (JP) ............................ 2007-143746
Feb. 29, 2008 (JP) ............................ 2008-050456

(51) Int. Cl.
*H02K 41/00* (2006.01)
(52) U.S. Cl. .................. 310/12.06; 310/12.33
(58) Field of Classification Search ............. 310/12.05, 310/12.06, 12.13, 12.15, 12.19, 12.22, 12.25, 310/12.26, 12.33
See application file for complete search history.

(56) References Cited

U.S. PATENT DOCUMENTS

| | | | |
|---|---|---|---|
| 4,667,139 A | 5/1987 | Hirai et al. | |
| 4,774,442 A | 9/1988 | Teramachi | |
| 5,363,774 A | 11/1994 | Anada et al. | |
| 5,760,500 A | 6/1998 | Kondo et al. | |

(Continued)

FOREIGN PATENT DOCUMENTS

JP     61-109637 A    5/1986

(Continued)

OTHER PUBLICATIONS

International Search Report of PCT/JP2008/059692, mailing date of Sep. 2, 2008.

*Primary Examiner*—Dang D Le
(74) *Attorney, Agent, or Firm*—Westerman, Hattori, Daniels & Adrian, LLP

(57) ABSTRACT

An X-Y table actuator is constituted by stacking a stationary plate, an intermediate plate, and a movable plate. Between the stationary plate and the intermediate plate, arranged is an X-direction drive means for driving the intermediate plate in an X-direction with respect to the stationary plate. Between the intermediate plate and the movable plate, on the other hand, there is provided a Y-direction drive means for moving the movable plate forward and backward in a Y-direction with respect to the intermediate plate. By stacking the stationary plate and the movable plate, which are formed into a substantially channel-shape, and the intermediate plate, which is formed into a substantially flat-shape on each other, a housing chamber for the X-direction drive means is formed between the stationary plate and the intermediate plate, and a housing chamber for the Y-direction drive means is formed between the intermediate plate and the movable plate.

8 Claims, 4 Drawing Sheets

U.S. PATENT DOCUMENTS

| | | | |
|---|---|---|---|
| 5,763,965 A * | 6/1998 | Bader | 310/12.06 |
| 6,670,730 B2 * | 12/2003 | Bartolotti | 310/12.15 |
| 2008/0217828 A1 | 9/2008 | Muto | |

FOREIGN PATENT DOCUMENTS

| | | |
|---|---|---|
| JP | 04-026970 B2 | 5/1992 |
| JP | 05-018415 A | 1/1993 |
| JP | 09-266660 A | 10/1997 |
| WO | 2005/124789 A1 | 12/2005 |
| WO | 2007/066501 A1 | 6/2007 |

* cited by examiner

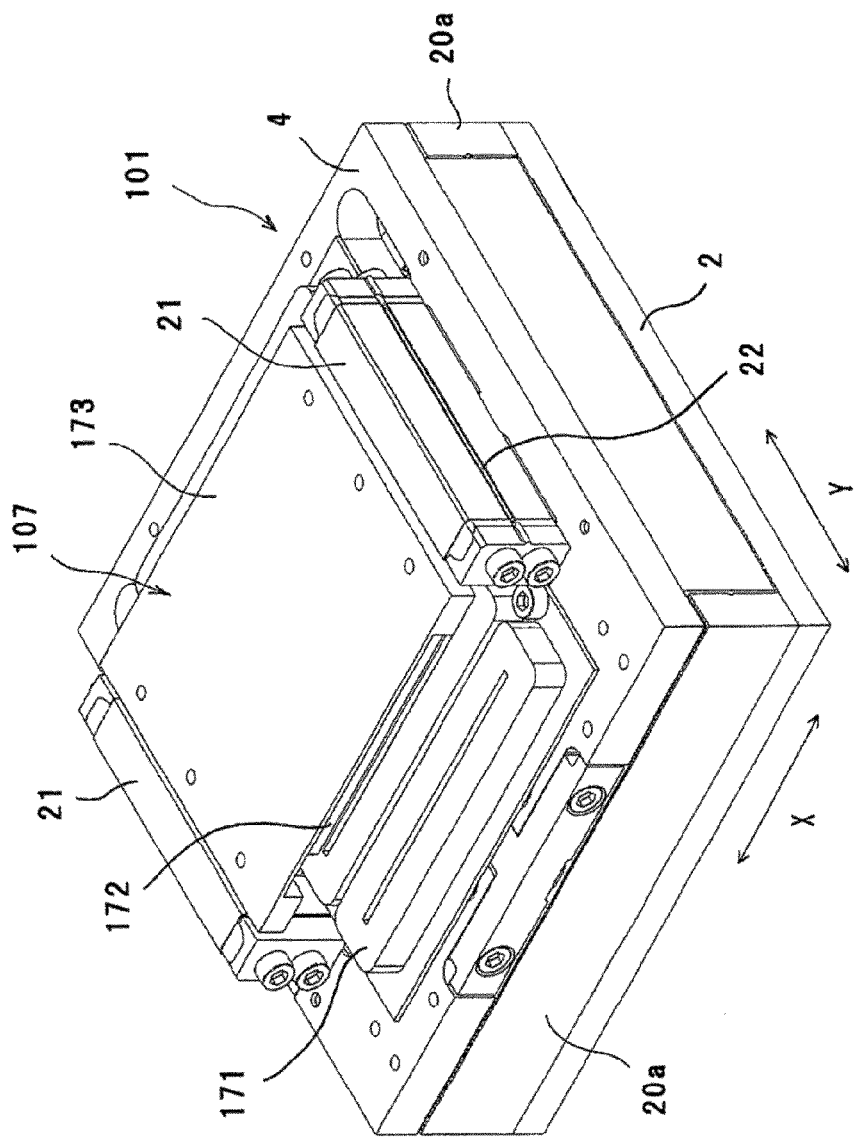

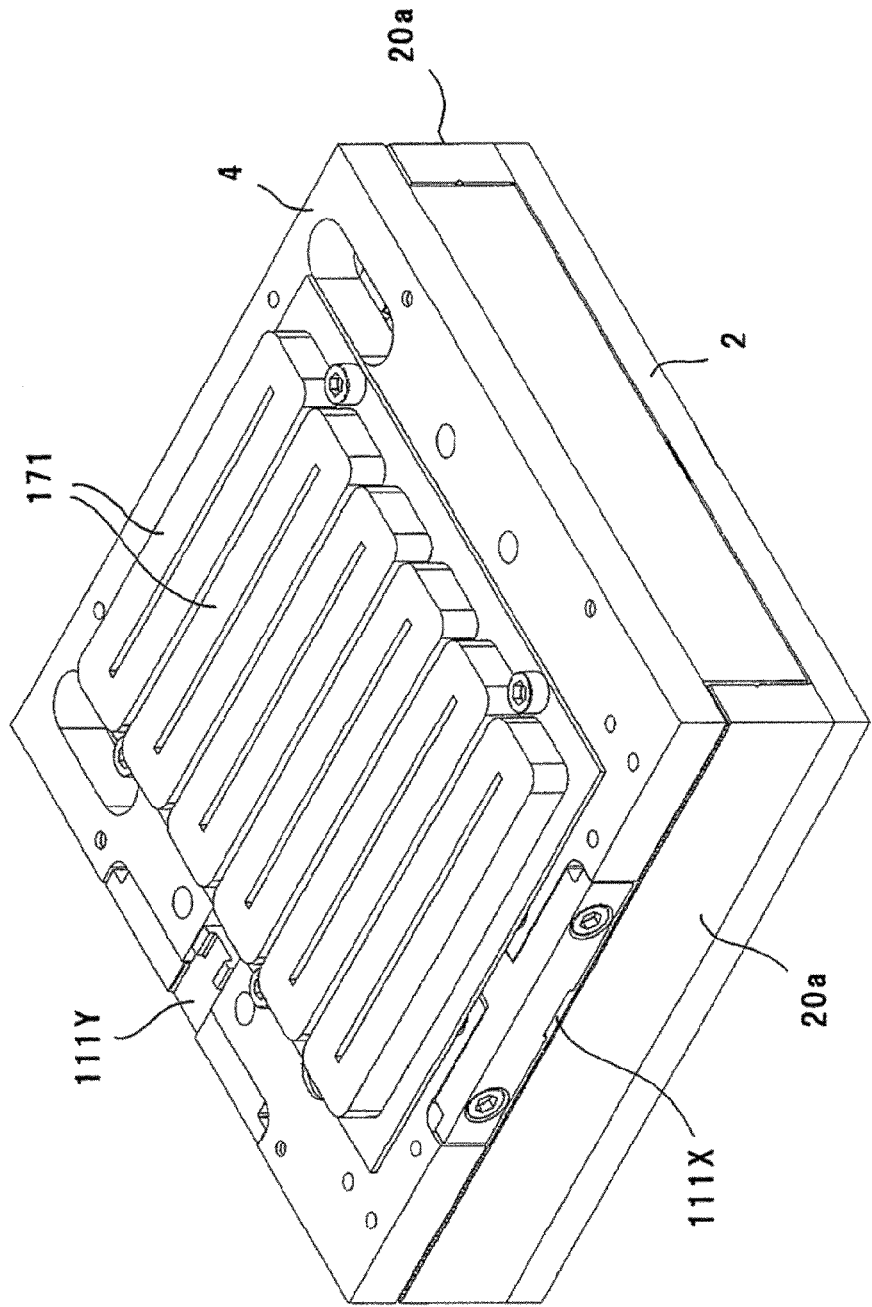

X-Y TABLE ACTUATOR

TECHNICAL FIELD

The present invention relates to an X-Y table actuator for moving and positioning an object freely in an X-Y plane and used in various types of testing devices, measuring devices, and conveying devices, and more specifically, to an X-Y table actuator that can be manufactured to be extremely thin.

BACKGROUND ART

As this type of X-Y table actuator, one disclosed in WO 2005/124789 (Patent Document 1) is conventionally known. The X-Y table actuator disclosed in Patent Document 1 includes a stationary plate to be fixed to a bed, a column, or the like, an intermediate plate freely movable in an X-direction with respect to the stationary plate, and a movable plate freely movable in a Y-direction with respect to the intermediate plate, where the three plates are stacked so that the movable plate is freely movable in the X-direction and in the Y-direction with respect to the stationary plate.

The stationary plate and the movable plate respectively include an accommodation groove and are formed into a channel-shape, whereas the intermediate plate is formed into a rectangular shape so as to be loosely fitted to the accommodation grooves. The lower half of the intermediate plate is assembled to the accommodation groove of the stationary plate through numerous balls so as to freely move in the X-direction in the accommodation groove. The upper half of the intermediate plate is assembled to the accommodation groove of the movable plate through numerous balls so that the movable plate freely moves in the Y-direction with respect to the intermediate plate. The movable plate at the highest level thus can freely move in the X-direction and in the Y-direction with respect to the stationary plate at the lowest level.

Patent Document 1 also describes an ultrasonic linear motor using a piezoelectric element as a means for moving the intermediate plate forward and backward in the X-direction with respect to the stationary plate by an arbitrary amount, and moving the movable plate forward and backward in the Y-direction with respect to the intermediate plate by an arbitrary amount. The ultrasonic linear motor is formed of a stator that produces a traveling wave by the piezoelectric element, and a movable element which is made of a thin metal plate and constitutes a traveling surface for the stator. The stator is arranged in a housing chamber formed in the intermediate plate, and the movable element is attached to the movable plate or the stationary plate at a position facing the stator, thereby constituting a drive means in the X-direction and a drive means in the Y-direction.

DISCLOSURE OF THE INVENTION

Problems to be Solved by the Invention

However, in the X-Y table actuator disclosed in Patent Document 1, the intermediate plate has a rectangular shape that can be loosely fitted to the respective accommodation grooves of the stationary plate and the movable plate. Therefore, a case arises in that one part of the intermediate plate needs to be cutout to form the housing chamber when providing one part of the drive means for driving the intermediate plate or the movable plate in the intermediate plate, as with the stator of the above-mentioned ultrasonic linear motor, and it is difficut to process the intermediate plate.

Further, the drive means in the X-direction and the drive means in the Y-direction are both mounted on the intermediate plate, and hence each drive means needs to be miniaturized to avoid interference between the drive means on the intermediate plate. Therefore, sufficient thrust becomes hard to apply to the movable table.

Consideration is made in using a linear motor including a magnet member and a coil member for the above drive means from the standpoint of providing sufficient thrust and speed to the movement of the movable plate in the X-direction and in the Y-direction. In this case, however, heat dissipation from the coil member needs to be taken into consideration, the relevant coil member needs to be mounted on the movable plate or the stationary plate, and the magnet member needs to be arrayed in the intermediate plate. However, the intermediate plate has a rectangular shape that can be loosely fitted to the respective accommodation grooves of the stationary plate and the movable plate and is formed one size smaller than the stationary plate and the movable plate. Therefore, the array length of the magnet member in the intermediate plate becomes shorter by such amount, and the stroke range of the intermediate plate with respect to the stationary plate as well as the stroke range of the movable plate with respect to the intermediate plate become limited.

Means for Solving the Problems

The present invention has been made in view of such problems, and an object thereof is to provide an X-Y table actuator which is capable of moving and positioning a movable table freely in an X-Y plane with a sufficient thrust and which can be simply manufactured at a low cost while achieving significant miniaturization.

That is, an X-Y table actuator of the present invention includes: a stationary plate; an intermediate plate, which is stacked on the stationary plate and which is freely movable in an X-direction with respect to the stationary plate; a movable plate, which is stacked on the intermediate plate and which is freely movable in a Y-direction with respect to the intermediate plate; an X-direction drive means for driving the intermediate plate in the X-direction with respect to the stationary plate, and a Y-direction drive means for driving the movable plate in the Y-direction with respect to the intermediate plate, in which the stationary plate and the movable plate are each formed into a substantially channel-shape, with being provided with a pair of side walls facing each other through an accommodation groove provided therebetween, and the intermediate plate is formed into a substantially flat-shape. Further, by stacking the stationary plate, the movable plate, and the intermediate plate on each other with the accommodation grooves of the stationary plate and the movable plate facing the intermediate plate, a housing chamber for the X-direction drive means is formed between the stationary plate and the intermediate plate, and a housing chamber for the Y-direction drive means being formed between the intermediate plate and the movable plate.

According to the present invention, a housing chamber for the X-direction drive means is formed between the stationary plate and the intermediate plate by stacking the stationary plate formed into a channel-shape and the intermediate plate formed into a flat-shape, and a housing chamber for the Y-direction drive means is formed between the movable plate and the intermediate plate by stacking the movable plate formed into a channel-shape and the intermediate plate formed into a flat-shape. Therefore, it is sufficient that the intermediate plate is formed simply into a flat-shape, and a recessed portion which constitutes the housing chamber for the drive means is not necessary to be processed. Therefore, easy manufacturing at low cost is realized.

The stroke ranges of the X-direction drive means and the Y-direction drive means can be set large compared to those in the prior art in which the intermediate plate is formed into a rectangular shape one size smaller than the stationary plate and the movable plate because the intermediate plate is formed to the same size as that of the stationary plate and the movable plate in the X-direction and in the Y-direction. The sizes of the movable plate and the stationary plate in the X-direction and in the Y-direction are not different from those of the prior art, and the height of the actuator merely increases slightly by the thickness of the intermediate plate of flat-shape. In other words, according to the X-Y table actuator of the present invention, the movement range of the movable plate in the X-direction and in the Y-direction can be extended without practically changing the size of the entire actuator compared to the conventional X-Y table actuator.

Further, the X-direction drive means and the Y-direction drive means do not interfere with each other because the X-direction drive means and the Y-direction drive means are provided in the housing chambers positioned on the front and the back, respectively, of the intermediate plate, and the thrust of the movable plate can be easily enhanced because the sizes of the X-direction drive means and the Y-direction drive means are not limited as long as the sizes are such that the drive means can be housed in the respective housing chambers.

BRIEF DESCRIPTION OF THE DRAWINGS

FIG. 4 is a perspective view illustrating a state in which a movable plate is removed from the X-Y table actuator according to a second embodiment of the present invention.

FIG. 5 is a perspective view illustrating a state in which the movable plate, a magnet member, and a linear guide are further removed from the X-Y table actuator according to the second embodiment.

BEST MODE FOR CARRYING OUT THE INVENTION

An X-Y table actuator of the present invention is hereinafter described in detail based on the accompanied drawings.

Figure 1:
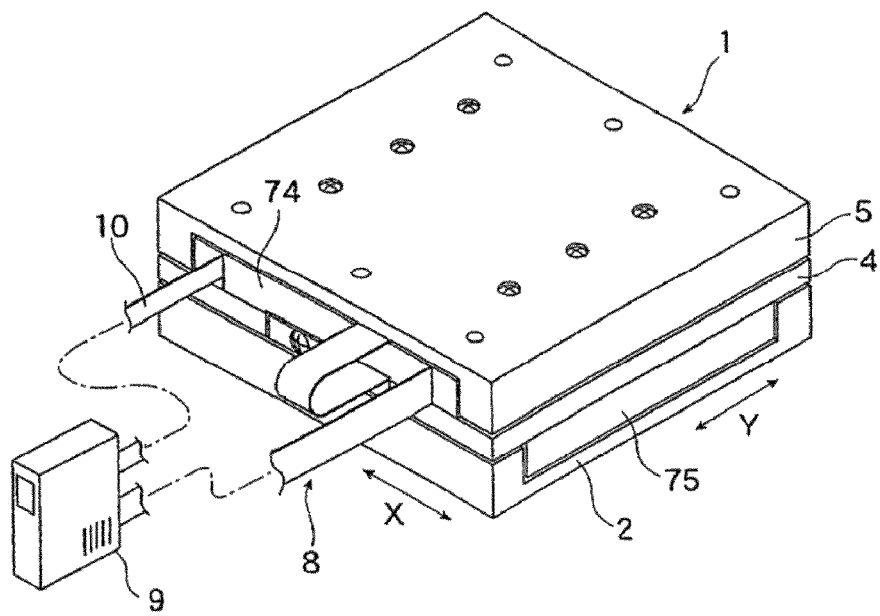
FIG. 1 is a perspective view illustrating a first embodiment of an X-Y table actuator to which the present invention is applied.

FIG. 1 is a perspective view illustrating a first embodiment of an X-Y table actuator to which the present invention is applied. An X-Y table actuator 1 includes a stationary plate 2 to be fixed to a fixed unit such as a housing or a bed of a mechanical device, an intermediate plate 4 assembled to the stationary plate 2 through a linear guide, and a movable plate 5 assembled to the intermediate plate 4 by way of a linear guide.

The intermediate plate 4 is provided to be feely movable in the X-direction with respect to the stationary plate 2, and the movable plate 5 is provided to be freely movable in the Y-direction with respect to the intermediate plate 3. Therefore, a movable body such as a test stage or a conveyance table can move freely in the X-direction and in the Y-direction with respect to the stationary plate 2 by being fixed to the movable plate 5.

The stationary plate 2, the intermediate plate 4, and the movable plate 5 have the same size in the X-Y plane, where the three plates 2, 4, 5 form a rectangular shape when overlapped one on top of the other, with the intermediate plate 4 and the movable plate 5 being set at the home position, as illustrated in FIG. 1. Therefore, the X-Y table actuator 1 itself is constituted to be extremely compact.

Further, though not recognized from the outer appearance illustrated in FIG. 1, an X-drive motor for driving the intermediate plate 4 in the X-direction is provided between the stationary plate 2 and the intermediate plate 4, and a Y-drive motor for driving the movable plate 5 in the Y-direction is housed between the intermediate plate 4 and the movable plate 5. Such X-drive motor and the Y-drive motor are connected with a driver 9 by a drive power cable 8, and the driver 9 sends a drive current to the X-drive motor and the Y-drive motor. A specific configuration of the X-drive motor and the Y-drive motor is described later in detail.

The X-Y table actuator 1 incorporates two sets of position detection means for measuring the movement amount in the X-direction of the intermediate plate 4 with respect to the stationary plate 2, and the movement amount in the Y-direction of the movable plate 5 with respect to the intermediate plate 4. Each position detection means is constituted by a linear scale and a detection sensor for reading the linear scale, where the detection sensor is mounted on the intermediate plate 4, and the linear scale is held by the stationary plate 2 or the movable plate 5 at a position facing the detection sensor. The combination of the linear scale and the detection sensor may be through an optical reading method or through a magnetic reading method.

The output signals of the two detection sensors are input to the driver 9 via a sensor signal cable 10, and the driver 9 generates the drive signal of the X-drive motor and the Y-drive motor while referencing the output signals of the detection sensors.

Figure 2:
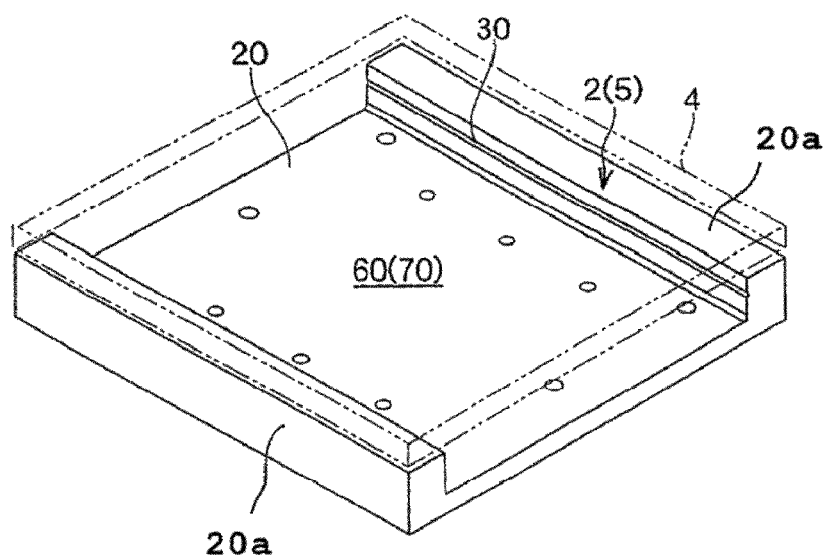
FIG. 2 is a perspective view illustrating a stationary plate of the X-Y table actuator according to a first embodiment of the present invention.

FIG. 2 is a perspective view illustrating the stationary plate 2. The stationary plate 2 is formed into a channel-shape by including a side wall 20a at both ends and including an accommodation groove 20 at the middle, where a rolling groove 30 of the ball is formed on the inner side surface of each side wall 20a facing the accommodation groove 20. The movable plate 5 is formed into a shape completely same as that of the stationary plate 2, but the phase when overlapped with the intermediate plate 4 is shifted by 90 degrees with respect to each other. In other words, the accommodation groove 20 is formed along the X-direction in the stationary plate 2, but the accommodation groove 20 is formed along the Y-direction in the movable plate 5.

The intermediate plate 4 is formed into a flat-shape having the size same as that of the stationary plate 2 and the movable plate 5 in the X-direction and in the Y-direction, where a space corresponding to the size of the accommodation groove 20 is formed between the stationary plate 2 and the intermediate plate 4 as illustrated in FIG. 2 by overlapping the intermediate plate 4, illustrated with a chain dashed line, with respect to the stationary plate 2, which space is used as a housing chamber 60 for the X-drive motor 6. Such space is also formed between the movable plate 5 and the intermediate plate 4, which space is used as a housing chamber 70 for the Y-drive motor.

Figure 3:
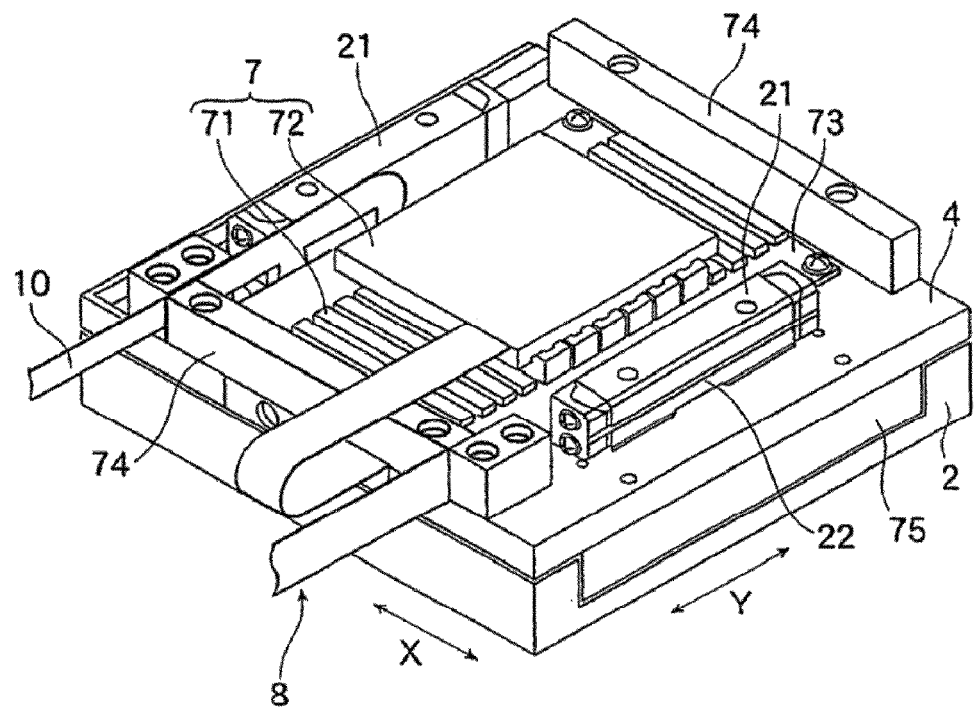
FIG. 3 is a perspective view illustrating a state in which a movable plate is removed from the X-Y table actuator according to the first embodiment.

FIG. 3 is a perspective view of the X-Y table actuator 1 illustrating a state in which the movable plate 5 is removed. A pair of linear guides 21 is fixed by a bolt with spacing in the X-direction on the surface of the intermediate plate 4 facing the movable plate 5. Each linear guide 21 includes a load rolling groove 22 facing the rolling groove 30 of the ball formed at the side wall 20a of the movable plate 5, and hence the movable plate 5 freely moves in the Y-direction with respect to the intermediate plate 4 by causing plural balls to roll between the rolling groove 30 of the movable plate 5 and the load rolling groove 22 of the linear guide 21 while being applied with load. The linear guide 21 also includes an endless circulation path of the ball, and hence the movable plate 5 can move with respect to the intermediate plate 4 within a range in which the rolling groove 30 faces the linear guide 21.

The intermediate plate 4 is arranged with the Y-drive motor 7 so as to be sandwiched by the above-mentioned pair of linear guides. The Y-drive motor 7 is a synchronous linear motor, and is constituted by a plurality of magnet members 71 arrayed in one line on the intermediate plate 4, and a coil member 72 being fixed to the movable plate 5 and facing the magnet members 71 with a slight gap.

The magnet member 71 is arrayed such that the N pole and the S pole are alternately directed to the coil member 72. Such magnet members 71 are arrayed on a holding plate 73 made of synthetic resin, where the magnet members 71 can be easily arrayed with respect to the intermediate plate 4 by fixing such a holding plate 73 to the intermediate plate 4. Each magnet member 71 is arrayed on the holding plate 73 by adhesive, but the magnet member 71 may be integrated with the holding plate 73 by injection molding the holding plate 73.

The coil member 72 is formed by winding a coil around a core member formed from a ferromagnetic body such as iron, where the distal end of the core member faces the magnet member 71 with a slight gap. The coil includes three-phases of u-phase, v-phase, and w-phase, and the coil member 71 generates a shifting magnetic field along the Y-direction when a three-phase AC is carried to such coils. A magnetic attraction force or a magnetic repulsive force acts between the magnet member 71 and the coil member 72 based on such shifting magnetic field, and hence the coil member 72 can be driven along the arraying direction of the magnet members 71.

FIG. 3 illustrates a structure on the surface side of the intermediate plate 4, that is, the side facing the movable plate 5, but the pair of linear guides 21 are also arranged on the back side of the intermediate plate 4, that is, the side facing the stationary plate 2, and hence the intermediate plate 4 freely moves in the X-direction with respect to the stationary plate 2. The X-drive motor for driving the intermediate plate 4 in the X-direction with respect to the stationary plate 2 is a synchronous linear motor constituted by the magnet members and the coil member, similar to the Y-drive motor, where the magnet members are fixed to the back side of the intermediate plate 4 and the coil member is fixed to the stationary plate 2.

In FIG. 3, reference numeral 74 denotes a dividing wall facing the accommodation groove 20 of the movable plate 5 with a slight gap, and is provided on both ends in the Y-direction at the front side of the intermediate plate 4. The dividing wall 74 prevents dust and the like from externally entering the housing chamber 70 for the Y-drive motor 7 formed between the movable plate 5 and the intermediate plate 4, and also limits the movement range of the coil member 72 fixed to the movable plate 5. In other words, the movable plate 5 can make stroke movement within the movement range of the coil member 72 regulated by the pair of dividing walls 74.

Similarly, a pair of dividing walls 75 is provided on the back side of the intermediate plate 4 in correspondence to both ends in the X-direction to prevent dust and the like from externally entering the housing chamber 60 for the X-drive motor formed between the stationary plate 2 and the intermediate plate 4, and also to limit the movement range of the coil member fixed to the stationary plate 2.

As illustrated in FIG. 1 or FIG. 3, one end of the drive power cable 8 is connected to the coil member 72 fixed to the movable plate 5. The drive power cable 8 is pulled out from the X-Y table actuator 1 through the intermediate plate 4, and connected to the driver 9 illustrated in FIG. 1. The drive power cable 8 is made from a flat band-shaped FPC having a thickness of about 150 μm, and thus can flexibly curve so as to connect the coil member 72 of the Y-drive motor 7 mounted on the movable plate 5 to the driver 9 while allowing the movable plate 5 to move in the X-direction and in the Y-direction.

The drive power cable for connecting the X-drive motor to the driver 9 is omitted in FIG. 1 and FIG. 3. This is because the coil member of the X-drive motor is attached to the stationary plate 2, and hence such coil member does not move in either the X-direction or the Y-direction, and the drive power cable can be connected to the driver without problem.

The sensor signal cable 10 illustrated in FIG. 1 and FIG. 3 is also made of a flat band-shaped FPC, and is pulled out from the intermediate plate 4 and connected to the driver 9. The direction in which the sensor signal cable 10, which is pulled out from the intermediate plate 4, freely curves matches the X-direction, which is the movement direction of the intermediate plate 4 with respect to the stationary plate 2. In other words, the sensor signal cable 10 flexibly follows the movement of the intermediate plate 4 in the X-direction, and does not inhibit the movement of the intermediate plate 4 in the X-direction.

In the X-Y table actuator 1 constituted as above, the housing chamber 60 for the X-direction drive means is formed between the stationary plate 2 and the intermediate plate 4 in correspondence to the accommodation groove 20 of the stationary plate 2 by stacking the stationary plate 2 formed into a channel-shape and the intermediate plate 4 formed into a flat-shape, as described with reference to FIG. 2. Further, the housing chamber 70 for the Y-direction drive means 7 is formed between the movable plate 5 and the intermediate plate 4 in correspondence to the accommodation groove 20 of the movable plate 5 by stacking the movable plate 5 formed into a channel-shape and the intermediate plate 4 formed into a flat-shape.

In other words, when forming the housing chambers of the X-direction drive means and the Y-direction drive means 7, the intermediate plate 4 may simply be a flat-shape, and a recessed area does not need to be processed with respect to the intermediate plate 4, and hence the X-Y table actuator 1 can be produced easily and at low cost.

The intermediate plate 4 is formed to the same size as the stationary plate 2 and the movable plate 5 in the X-direction and in the Y-direction, and the length in the X-direction of the housing chamber 60 for the X-direction drive means between the stationary plate 2 and the intermediate plate 4 matches the length in the X-direction of the stationary plate. Further, the length in the Y-direction of the housing chamber 70 for the Y-direction drive means 7 between the intermediate plate 4 and the movable plate 5 matches the length in the Y-direction of the movable plate 5. Thus, the amount of stroke in the X-direction of the intermediate plate 4 and the amount of stroke in the Y-direction of the movable plate 5 are ensured to a maximum extent with respect to the size of the stationary plate 2 and the movable plate 5, and the movement range of the movable plate in the X-Y plane can be set large while miniaturizing the X-Y table actuator 1.

A second embodiment of the X-Y table actuator to which the present invention is applied is described.

In the above-mentioned first embodiment, the magnet member of the X-direction drive motor is arranged on the intermediate plate and the coil member is arranged on the stationary plate, and the magnet member in the Y-direction drive motor is arranged on the intermediate plate 4 and the coil member is arranged on the stationary plate 2. However, in an X-Y table actuator 101 of the second embodiment, the arrangement positions of the magnet member and the coil member are reversed and the coil members of the X-direction drive motor and the Y-direction drive motor are arranged on the intermediate plate. The structure related to the stationary plate 2, the intermediate plate 4, and the movable plate 5, and the structure related to the linear guide 21 for bearing the plates in a freely movable manner are the same as those in the first embodiment described above, and thus the reference numerals same as those used in the first embodiment are denoted in the figure and the detailed description thereof is omitted in the following description.

FIG. 4 is a perspective view illustrating a state in which the movable plate 5 is removed in the X-Y table actuator 101 according to the second embodiment. The Y-drive motor 107 is arranged on the intermediate plate 4 so as to be sandwiched by the pair of linear guides 21 described above. The Y-drive motor 107 is a synchronous linear motor, and is constituted by a plurality of coil members 171 arrayed in one line on the intermediate plate 4, and a magnet member 172 being fixed to the movable plate 5 and facing the coil members 171 with a slight gap.

The magnet member 172 is arrayed such that the N pole and the S pole are alternately directed to the coil member 171 in the Y direction. Such magnet members 172 are arrayed on a holding plate 713 made of synthetic resin, where the magnet members 172 can be easily arrayed with respect to the intermediate plate 5 by fixing such a holding plate 173 to the intermediate plate 5. Each magnet member 172 is arrayed on the holding plate 173 by adhesive, but the magnet member 172 may be integrated with the holding plate 173 by injection molding the holding plate 173.

FIG. 5 illustrates the X-Y table actuator 101 of a state in which the pair of linear guides 21 and the magnet member 172 are further removed from the state illustrated in FIG. 4. Each coil member 171 arrayed on the intermediate plate is formed by winding a coil around a core member formed from a ferromagnetic body such as iron, where the distal end of the core member faces the magnet member 172 held by the movable plate 5 with a slight gap. The coil member 171 is provided in correspondence to u-phase, v-phase, and w-phase of the three-phase AC, where three coil members 171 form a pair and generate a shifting magnetic field when the three-phase AC is flowed thereto. Two sets of six coil members 171 are arrayed along the Y-direction with respect to the intermediate plate 4 in the example illustrated in FIG. 5. A magnetic attraction force or a magnetic repulsive force acts between the magnet member 172 and the coil member 171 based on the shifting magnetic field generated by the coil members 171, and hence the magnet member 172 can be driven along the arraying direction of the coil members 171.

FIGS. 4 and 5 illustrate a structure on the surface side of the intermediate plate 4, that is, the side facing the movable plate 5, but the pair of linear guides 21 are also arranged on the back side of the intermediate plate 4, that is, the side facing the stationary plate 2, and hence the intermediate plate 4 freely moves in the X-direction with respect to the stationary plate 2. The X-drive motor for driving the intermediate plate 4 in the X-direction with respect to the stationary plate 2 is a synchronous linear motor constituted by the magnet members and the coil member, similar to the Y-drive motor 107, where the coil members are fixed to the back side of the intermediate plate 4 and the magnet member is fixed to the stationary plate 2.

As illustrated in FIG. 4, the array length in the Y-direction of the magnet member 172 at the movable plate 5 is set shorter than the array length of the coil member 171 at the intermediate plate 4, where the magnet member 172 is driven in the Y-direction only within the range in which the coil member 171 is arrayed when the three-phase AC is flowed to the coil member 171. In other words, the magnet member 172 does not reciprocate in the Y-direction beyond the arrangement range of the coil member 171, and the magnetic force of the magnet member 172 is prevented from acting to the end in the Y-direction of the intermediate plate 4 irrespective of the coil member 171. Thus, the drawback that the magnetic force of the magnet member 172 acts on the intermediate plate 4, thereby causing cogging is prevented, and sufficient thrust can be applied to the movable plate 5 even with a small linear motor using most of the thrust exhibited by the linear motor to drive the movable plate 5 in the Y-direction.

Such relationship between the magnet member 172 and the coil member 171 is not limited to the Y-drive motor 107, and is the same in the magnet member and the coil member of the X-drive motor for driving the intermediate plate 4 in the X-direction with respect to the stationary plate 2.

The pair of coil members constituting the X-direction drive motor and the Y-direction drive motor are arranged on the intermediate plate 4, and hence the cables for supplying power to such coil members can be bundled into one and then pulled out from the intermediate plate 4, whereby the pull-around structure of the cable with respect to the intermediate plate 4 can be simplified as the intermediate plate 4 only moves in the X-direction and does not move in the Y-direction, and the X-Y table actuator 101 of the present invention can be manufactured easily and at low cost.

On the other hand, as illustrated in FIG. 5, an encoder 111Y is attached to the intermediate plate 4 at a position facing the side wall 20a of the movable plate 5, which encoder 111Y reads the linear scale fixed to the side wall 20a of the movable plate 5 to detect the actual movement amount in the Y-direction of the movable plate 5 with respect to the intermediate plate 4. Similarly, an encoder 111X is attached to the intermediate plate 4 at a position facing the side wall 20a of the stationary plate 2, which encoder 111X reads the linear scale fixed to the side wall 20a of the stationary plate 2 to detect the actual movement amount in the X-direction of the intermediate plate 4 with respect to the stationary plate 2.

A position displacement sensor disclosed in Japanese Patent Application Laid-open No. 2004-271423 can be used for the combination of the linear scale and the encoder.

In the X-Y table actuator 101 according to the second embodiment constituted as above, the coil members of the X-drive motor and the Y-drive motor are respectively arranged with respect to the intermediate plate 4, and the intermediate plate 4, whose temperature easily rises, is covered by the movable plate 5 and the stationary plate 2 from above and below, and thus the intermediate plate 4 is hard to be cooled compared to the movable plate 5 and the stationary plate 2. The temperature of the intermediate plate 4 easily rises compared to the movable plate 5 and the stationary plate 2 during the operation of the X-Y table actuator 101, and the movable plate 5 and the stationary plate 2 is easily cooled compared to the intermediate plate 4 when stopped after the operation, whereby the temperature of the intermediate plate 4 has a property of easily becoming high compared to that of the movable plate 5 and the stationary plate 2.

If a temperature difference occurs between the intermediate plate 4 and the movable plate 5, each plate 4, 5 causes thermal expansion corresponding to its temperature, whereby the distance of the load rolling groove 22 of the linear guide 21 and the rolling groove 30 of the movable plate 5 changes. The distance becomes too small and preload is applied in excess on the ball of the linear guide 21 at times, or the distance becomes too large and the ball separates from the load rolling groove 22 or the rolling groove 30 at other times. This is the same in the relationship between the intermediate plate 4 and the stationary plate 2.

In the X-Y table actuator 101 of this embodiment, the pair of side walls 20a fixed to the movable plate 5 sandwich the pair of linear guides 21 fixed to the intermediate plate 4 from the outer side, and thus excessive preload tends to be applied on the ball of the linear guide 21 if the thermal expansion amount of the intermediate plate 4 is greater than that of the movable plate 5, whereas the ball tends to easily separate from the load rolling groove 22 or the rolling groove 30 if the thermal expansion amount of the movable plate 5 is greater than that of the intermediate plate 4.

From the standpoint of preventing excessive preload originating from the thermal expansion of the plates 4, 5 from being applied on the ball between the movable plate 5 and the intermediate plate 4, a distance slightly larger than the ball diameter can be provided to between the load rolling groove 22 and the rolling groove 30 when assembling the X-Y table actuator 101 assuming the increase in preload by thermal expansion. However, if such setting is made in time of assembly, the ball tends to easily separate from the load rolling groove 22 or the rolling groove 30 when the relationship of the thermal expansion amount of the movable plate 5 and the intermediate plate 4 is reversed. In other words, if the temperature difference of the movable plate 5 and the intermediate plate 4 displaces in both positive/negative directions, the fluctuation amount in the distance between the load rolling groove 22 and the rolling groove 30 becomes large by itself. In order to suppress the fluctuation amount in the distance between the load rolling groove 22 and the rolling groove 30, the heat generation amount of the coil member 171 of the linear motor needs to be suppressed and a large current cannot be flowed to the coil member 171.

However, in the X-Y table actuator 101 of the present invention, the coil member 171 of the linear motor is arranged on the intermediate plate 4. Therefore, the temperature of the intermediate plate 4 becomes high compared to that of the movable plate 5 and the stationary plate 2 at both in time of operation, as described above, and in time of stopping, whereby the fluctuation in the distance between the load rolling groove 22 and the rolling groove 30 can be suppressed small from the time of operation and to the time of stop. Therefore, compared to the conventional X-Y table actuator in which the coil member is arranged with respect to the movable plate and the stationary plate, in the X-Y table actuator 101 of the present invention, a large current can be flowed to the coil member 171, and the movable plate can be driven in the X-direction and in the Y-direction with a large thrust.

There is a fear that, if the temperature of the intermediate plate 4 becomes extremely higher than the temperature of the movable plate 5 due to heat generation of the coil member 171 and the thermal expansion amount of the intermediate plate 4 far exceeds that of the movable plate 5, an excessive preload is applied on the ball of the linear guide 21, and the lifespan of the product may significantly lower.

Thus, in the X-Y table actuator 101 according to this embodiment, the material of the plates 2, 4, 5 is selected such that the linear expansion coefficient of the intermediate plate 4 on which the coil member 171 is arranged becomes smaller than the linear expansion coefficient of the stationary plate 2 or the movable plate 5 on which the magnet member 172 is arranged. Further, the linear expansion coefficient of the stationary plate and the movable plate is selected to be smaller than $10 \times 10^{-6} (1/°C.)$, which is a linear expansion coefficient of a general carbon steel. Specifically, a low expansion cast metal having a linear expansion coefficient of $0.8 \times 10^{-6} (1/°C.)$ is used for the intermediate plate, and a low expansion cast metal having a linear expansion coefficient of $2.5 \times 10^{-6} (1/°C.)$ is used for the stationary plate and the movable plate. With this, the excessive preload is prevented from being applied on the ball while suppressing rattling between the movable plate and the intermediate plate and between the stationary plate and the intermediate plate, and the movable plate can be moved with satisfactory accuracy in the X-direction and in the Y-direction.

The invention claimed is:

1. An X-Y table actuator, comprising:
a stationary plate;
an intermediate plate, which is stacked on the stationary plate and which is freely movable in an X-direction with respect to the stationary plate;
a movable plate, which is stacked on the intermediate plate and which is freely movable in a Y-direction with respect to the intermediate plate;
an X-direction drive means for driving the intermediate plate in the X-direction with respect to the stationary plate; and
a Y-direction drive means for driving the movable plate in the Y-direction with respect to the intermediate plate, wherein:
the stationary plate and the movable plate are each formed into a substantially channel-shape, with being provided with a pair of side walls facing each other through an accommodation groove provided therebetween, and the intermediate plate is formed into a substantially flat-shape; and
by stacking the stationary plate, the movable plate, and the intermediate plate on each other, with the accommodation grooves of the stationary plate and the movable plate facing the intermediate plate, a housing chamber of the X-direction drive means is formed only between the stationary plate and the intermediate plate, and a housing chamber of the Y-direction drive means is formed only between the intermediate plate and the movable plate.

2. The X-Y table actuator according to claim 1, wherein the X-direction drive means and the Y-direction drive means are respectively linear motors comprising a magnet member and a coil member facing the magnet member, the magnet member being arranged on the intermediate plate, and the coil member being arranged in the accommodation grooves of the stationary plate and the movable plate.

3. The X-Y table actuator according to claim 1, wherein the X-direction drive means and the Y-direction drive means are respectively linear motors comprising a magnet member and a coil member facing the magnet member, the coil member of the X-direction drive means and the coil member of the Y-direction drive means both being arranged on the intermediate plate, the magnet member of the X-direction drive means being arranged on the stationary plate, and the magnet member of the Y-direction drive means being arranged on the movable plate.

4. The X-Y table actuator according to claim 3, wherein an arrangement length of the coil member along a driving direction of the linear motor is greater than an arrangement length of the opposing magnet member.

5. The X-Y table actuator according to claim 3, wherein a linear expansion coefficient of the intermediate plate on which the coil member is arranged is smaller than a linear expansion coefficient of the stationary plate or the movable plate on which the magnet member is arranged.

6. The X-Y table actuator according to claim 5, wherein the linear expansion coefficient of the stationary plate, the linear expansion coefficient of the movable plate, and the linear expansion coefficient of the intermediate plate are smaller than $10\times10^{-6}(1/°C.)$.

7. The X-Y table actuator according to claim 3, wherein a power supply line to the coil member of the X-direction drive means and the coil member of the Y-direction drive means is accommodated in one flexible printed circuit board, and is pulled out from the intermediate plate.

8. The X-Y table actuator according to claim 1, wherein the housing chamber of the X-direction drive means and the housing chamber of the Y-direction drive means are divided through the intermediate plate.

* * * * *